United States Patent [19]
Batchelor

[11] Patent Number: 5,746,318
[45] Date of Patent: May 5, 1998

[54] REUSEABLE FACIAL TISSUE DISPENSING SYSTEM

[76] Inventor: Sally Fiona Batchelor, 39 The Avenue, March, Cambridgeshire, PE5 9PS, United Kingdom

[21] Appl. No.: 783,355

[22] Filed: Jan. 16, 1997

[51] Int. Cl.⁶ ............................................. B65D 73/00
[52] U.S. Cl. ............................................. 206/494; 229/150
[58] Field of Search .................................. 206/233, 449, 206/494; 229/149, 150

[56] References Cited

U.S. PATENT DOCUMENTS

| | | | |
|---|---|---|---|
| 291,281 | 1/1884 | Blakely | 229/150 |
| 632,222 | 8/1899 | Malatesta | 229/150 |
| 1,649,452 | 11/1927 | De Clercq | 229/150 |
| 2,890,791 | 6/1959 | Wenzel | 206/494 |
| 3,119,516 | 1/1964 | Donovan | 206/494 |
| 3,258,156 | 6/1966 | Smith | 206/494 |
| 4,623,074 | 11/1986 | Dearwester | 206/494 |
| 5,540,354 | 7/1996 | Annand | 206/449 |

*Primary Examiner*—David T. Fidei

[57] ABSTRACT

A new Reusable Facial Tissue Dispensing System for providing an enviromentally friendly tissue dispensing box which may be reused many times thereby reducing the amount of garbage. The inventive device includes a tissue dispensing box having an open rear side and a top side, an opening into the top side, a left and right flap, a top flap and a bottom flap pivotally secured to respective sides, a slit in the bottom flap and a tongue flap secured to the top flap. The slit receives the tongue flap when the box is closed with the tissue paper positioned within an interior of the box. Thereafter, the tissue paper is manually dispensed through the opening.

6 Claims, 2 Drawing Sheets

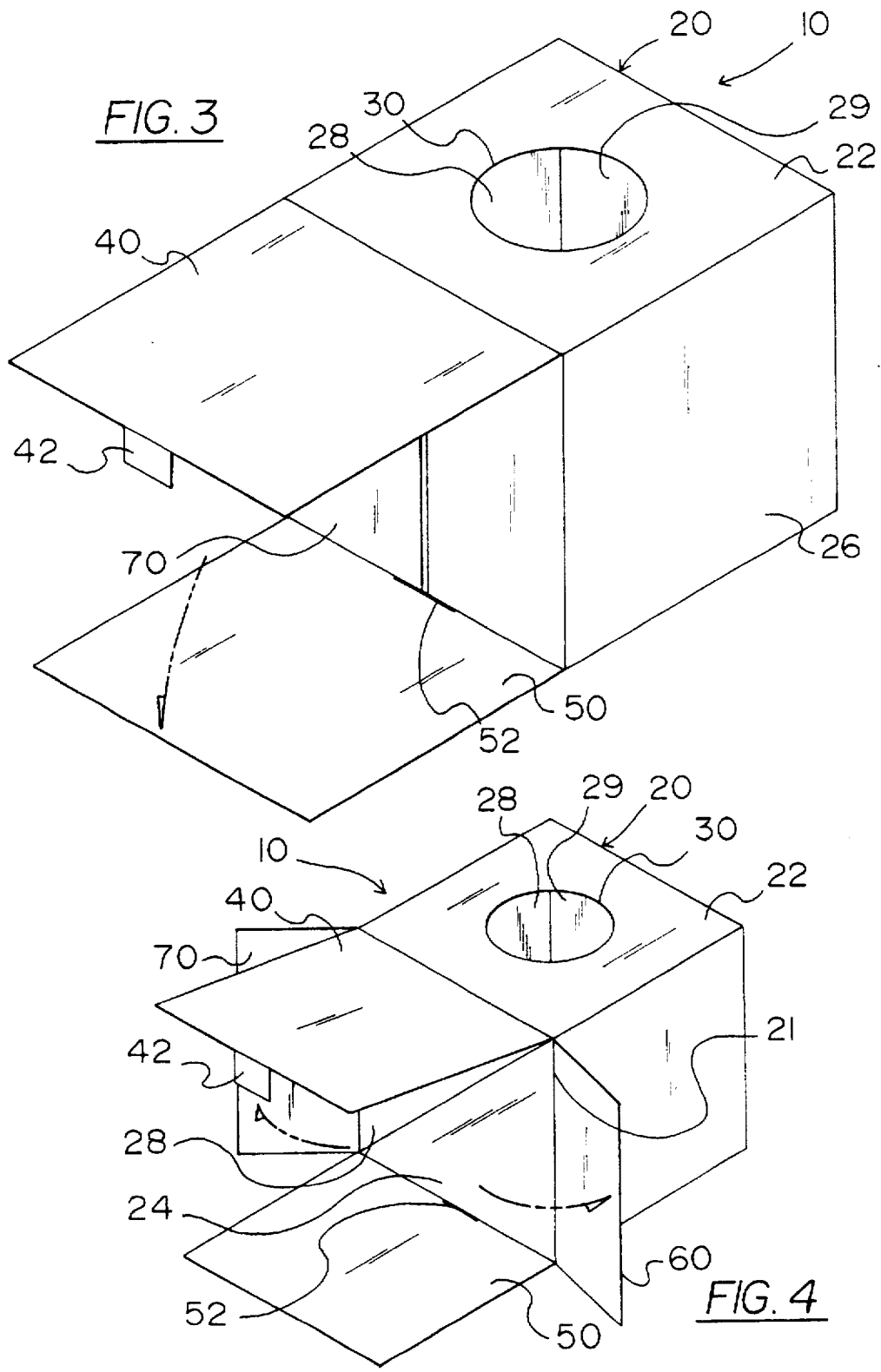

REUSEABLE FACIAL TISSUE DISPENSING SYSTEM

BACKGROUND OF THE INVENTION

1. Field of the Invention

The present invention relates to Tissue Box Devices and more particularly pertains to a new Reusable Facial Tissue Dispensing System for providing an enviromentally friendly tissue dispensing box which may be reused many times thereby reducing the amount of garbage.

2. Description of the Prior Art

The use of Tissue Box Devices is known in the prior art. More specifically, Tissue Box Devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art Tissue Box Devices include U.S. Pat. No. 5,219,421; U.S. Pat. No. 5,332,117; U.S. Design Pat. No. 352,412; U.S. Pat. No. 5,076,465; U.S. Pat. No. 5,332,138 and U.S. Pat. No. 4,616,767.

While these devices fulfill their respective, particular objectives and requirements, the aforementioned patents do not disclose a new Reusable Facial Tissue Dispensing System. The inventive device includes a tissue dispensing box having an open rear side and a top side, an opening into the top side, a left and right flap, a top flap and a bottom flap pivotally secured to respective sides, a slit in the bottom flap and a tongue flap secured to the top flap.

In these respects, the Reusable Facial Tissue Dispensing System according to the present invention substantially departs from the conventional concepts and designs of the prior art, and in so doing provides an apparatus primarily developed for the purpose of providing an enviromentally friendly tissue dispensing box which may be reused many times thereby reducing the amount of garbage.

SUMMARY OF THE INVENTION

In view of the foregoing disadvantages inherent in the known types of Tissue Box Devices now present in the prior art, the present invention provides a new Reusable Facial Tissue Dispensing System construction wherein the same can be utilized for providing an enviromentally friendly tissue dispensing box which may be reused many times thereby reducing the amount of garbage.

The general purpose of the present invention, which will be described subsequently in greater detail, is to provide a new Reusable Facial Tissue Dispensing System apparatus and method which has many of the advantages of the Tissue Box Devices mentioned heretofore and many novel features that result in a new Reusable Facial Tissue Dispensing System which is not anticipated, rendered obvious, suggested, or even implied by any of the prior art Tissue Box Devices, either alone or in any combination thereof.

To attain this, the present invention generally comprises a tissue dispensing box having an open rear side and a top side, an opening into the top side, a left and right flap, a top flap and a bottom flap pivotally secured to respective sides, a slit in the bottom flap and a tongue flap secured to the top flap.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new Reusable Facial Tissue Dispensing System apparatus and method which has many of the advantages of the Tissue Box Devices mentioned heretofore and many novel features that result in a new Reusable Facial Tissue Dispensing System which is not anticipated, rendered obvious, suggested, or even implied by any of the prior art Tissue Box Devices, either alone or in any combination thereof.

It is another object of the present invention to provide a new Reusable Facial Tissue Dispensing System which may be easily and efficiently manufactured and marketed.

It is a further object of the present invention to provide a new Reusable Facial Tissue Dispensing System which is of a durable and reliable construction.

An even further object of the present invention is to provide a new Reusable Facial Tissue Dispensing System which is susceptible of a low cost of manufacture with regard to both materials and labor, and which accordingly is then susceptible of low prices of sale to the consuming public, thereby making such Reusable Facial Tissue Dispensing System economically available to the buying public.

Still yet another object of the present invention is to provide a new Reusable Facial Tissue Dispensing System which provides in the apparatuses and methods of the prior art some of the advantages thereof, while simultaneously overcoming some of the disadvantages normally associated therewith.

Still another object of the present invention is to provide a new Reusable Facial Tissue Dispensing System for providing an enviromentally friendly tissue dispensing box which may be reused many times thereby reducing the amount of garbage.

Yet another object of the present invention is to provide a new Reusable Facial Tissue Dispensing System which includes a tissue dispensing box having an open rear side and a top side, an opening into the top side, a left and right flap, a top flap and a bottom flap pivotally secured to respective sides, a slit in the bottom flap and a tongue flap secured to the top flap.

Still yet another object of the present invention is to provide a new Reusable Facial Tissue Dispensing System that reduces the cost of buying a tissue box containing tissue paper by eliminating the need to purchase the tissue box.

Even still another object of the present invention is to provide a new Reusable Facial Tissue Dispensing System that receives a tissue refill packet.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

DESCRIPTION OF THE DRAWINGS

The invention will be better understood and objects other than those set forth above will become apparent when consideration is given to the following detailed description thereof. Such description makes reference to the annexed drawings wherein:

FIG. 3 is an upper perspective view of the present invention with the bottom flap and top flap open.

FIG. 4 is an upper perspective view of the present invention with the bottom flap, left flap, right flap and top flap open.

DESCRIPTION OF THE PREFERRED EMBODIMENT

Figure 1:
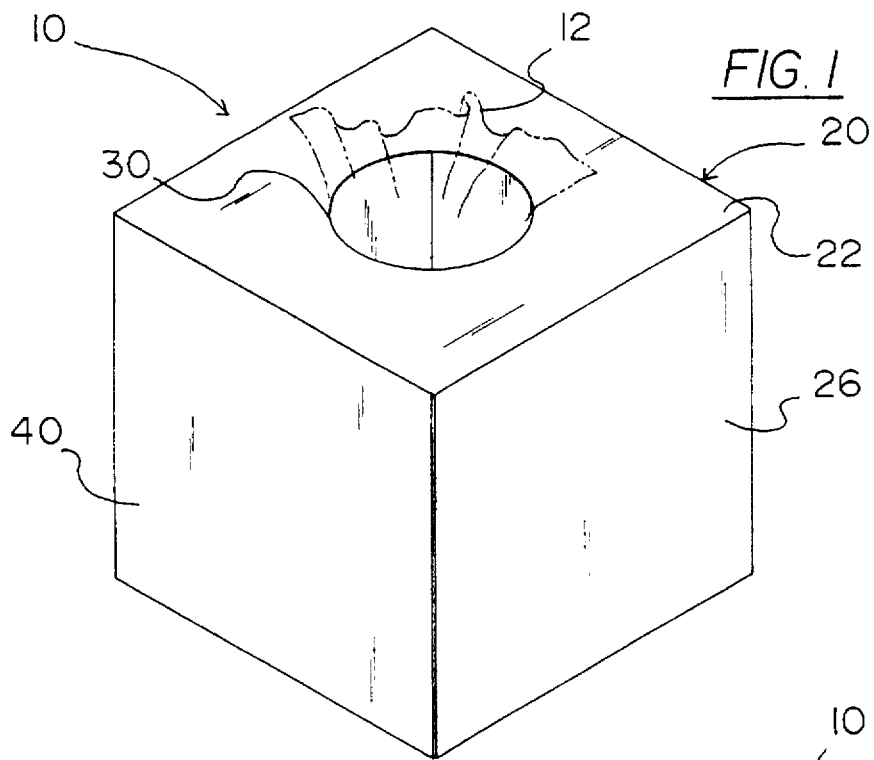
FIG. 1 is an upper perspective view of a new Reusable Facial Tissue Dispensing System in the closed position according to the present invention.

With reference now to the drawings, and in particular to FIGS. 1 through 4 thereof, a new Reusable Facial Tissue Dispensing System embodying the principles and concepts of the present invention and generally designated by the reference numeral 10 will be described.

More specifically, it will be noted that the Reusable Facial Tissue Dispensing System 10 comprises a tissue dispensing box 20 having a top side 22, a bottom side 24, a left side 26, a right side 28, a front side 29 and an open rear side 21 forming an interior. The open rear side 21 has an outer perimeter as best shown in FIG. 4 of the drawings. The tissue dispensing box 20 preferably is constructed from a resilient plastic or corrugated cardboard which may be reused many times.

Figure 2:
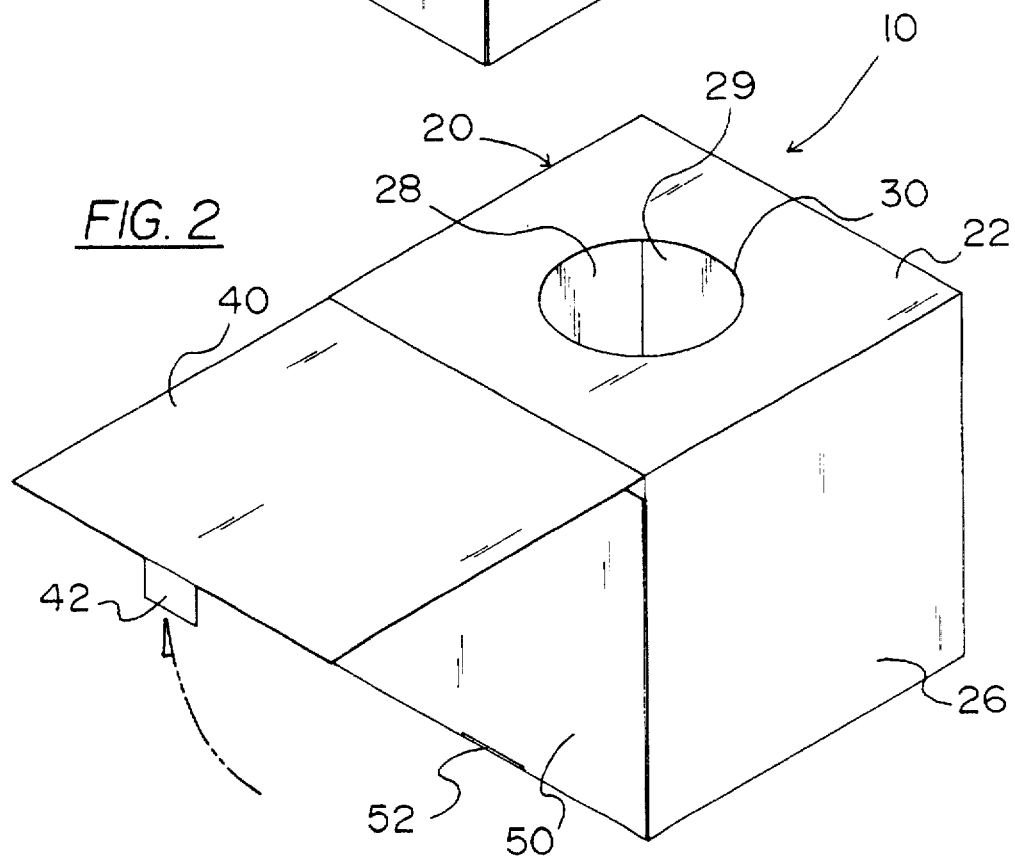
FIG. 2 is an upper perspective view of the present invention with the top flap open.

As shown in FIGS. 1 through 4 of the drawings, the top side 22 includes an opening 30 concentrically positioned allowing a tissue paper 12 to be dispensed through from within the interior. A left flap 60 is pivotally secured to the outer perimeter adjacent to the left side 26 as best shown in FIGS. 3 and 4 of the drawings. A right flap 70 is pivotally secured to the outer perimeter adjacent to the right side 28 as best shown in FIGS. 3 and 4 of the drawings. The left flap 60 and the right flap 70 are positioned within the open rear side 21 when the tissue dispensing box 20 is closed thereby substantially closing the open rear side 21 as shown in FIG. 3 of the drawings. A bottom flap 50 is pivotally secured to the outer perimeter adjacent to the bottom side 24 forming a pivotal intersection as best shown in FIGS. 2 through 4 of the drawings. The bottom flap 50 is positioned juxtaposed to the left flap 60 and the right flap 70 when the tissue dispensing box 20 is closed thereby substantially closing the open rear side 21 as shown in FIG. 2 of the drawings.

As shown in FIGS. 1 through 4 of the drawings, a top flap 40 has a first end and a second end. The first end is pivotally secured to the outer perimeter adjacent to the top side 22 as best shown in FIGS. 2 through 4 of the drawings. The pivotal intersection includes a slit 52 concentrically positioned as best shown in FIG. 2 of the drawings. A tongue flap 42 is pivotally secured to the second end of the top flap 40 substantially concentric as shown in FIGS. 2 through 4 of the drawings. The tongue flap 42 matingly couples with the slit 52 within the pivotal intersection when the tissue dispensing box 20 is closed thereby retaining the top flap 40 juxtaposed to the bottom flap 50 thereby preventing accidental removal of a tissue refill packet positioned within the interior. The interior is formed to receive the tissue refill packet through the open rear side 21 when the top flap 40, the bottom flap 50, the left flap 60 and the right flap 70 are disengaged as shown in FIG. 4 of the drawings. The bottom flap 50 is preferably substantially the same size as the open rear side 21 as best shown in FIG. 2 of the drawings. The left flap 60 and the right flap 70 preferably individually form semi-portions of the open rear side 21 as best shown in FIG. 3 of the drawings.

In use, the use inserts the tissue refill packet into the interior of the tissue dispensing box 20 through the open rear side 21. Thereafter, the left flap 60 and the right flap 70 are folded inwardly towards each other until they are substantially parallel to one another thereby substantially enclosing the open rear side 21. Then the bottom flap 50 is folded upwardly until juxtaposed to the left flap 60 and the right flap 70 thereby substantially enclosing the open rear side 21. The top flap 40 is folded downwardly until juxtaposed to the bottom flap 50. The tongue flap 42 is inserted into the slit 52 thereby retaining the top flap 40 juxtaposed to the bottom flap 50 to prevent opening of the present invention. When the tissue refill packet is empty, the above procedure is reversed allowing the empty refill packet to be removed and the above procedure to be repeated thereby allowing the present invention to be utilized many times without requiring the purchase of another tissue box as required by conventional tissue dispensing products.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A Reusable Facial Tissue Dispensing System comprising:

a tissue dispensing box having a top side, a bottom side, a left side, a right side, a front side and an open rear side forming an interior;

said open rear side having an outer perimeter;

said top side includes an opening concentrically positioned allowing a tissue paper to be dispensed through from within said interior;

a left flap pivotally secured to said outer perimeter adjacent to said left side;

a right flap pivotally secured to said outer perimeter adjacent to said right side, wherein said left flap and said right flap are positioned within said open rear side when said tissue dispensing box is closed thereby substantially closing said open rear side;

a bottom flap pivotally secured to said outer perimeter adjacent to said bottom side forming a pivital intersection, wherein said bottom flap is positioned juxtaposed to said left flap and said right flap when said tissue dispensing box is closed thereby substantially closing said open rear side;

a top flap having a first end and a second end;

said first end pivotally secured to said outer perimeter adjacent to said top side;

said pivotal intersection including a slit concentrically positioned; and a rectangular tongue flap pivotally secured to said second end of said top flap substantially concentric for matingly coupling with said slit within said pivotal intersection when said tissue dispensing box is closed, said tongue flap having a length parallel said second end of said top flap being not greater than one sixth the length of said second end of said top flap.

2. The Reusable Facial Tissue Dispensing System of claim 1, wherein said interior is formed to receive a tissue refill packet through said open rear side when said top flap, said bottom flap, said left flap and said right flap are disengaged.

3. The Reusable Facial Tissue Dispensing System of claim 2, wherein said bottom flap is substantially the same size as said open rear side.

4. The Reusable Facial Tissue Dispensing System of claim 3, wherein said left flap and said right flap individually form semi-portions of said open rear side.

5. The Reusable Facial Tissue Dispensing System of claim 4, wherein said tissue dispensing box comprises a resilient plastic.

6. The Reusable Facial Tissue Dispensing System of claim 4, wherein said tissue dispensing box comprises a corrugated cardboard.

* * * * *